US008661077B2

(12) United States Patent
Roach et al.

(10) Patent No.: US 8,661,077 B2
(45) Date of Patent: *Feb. 25, 2014

(54) METHODS, SYSTEMS AND COMPUTER READABLE MEDIA FOR PROVIDING A FAILOVER MEASURE USING WATCHER INFORMATION (WINFO) ARCHITECTURE

(75) Inventors: Adam Boyd Roach, Dallas, TX (US); Robert James Sparks, Plano, TX (US); Ben Allen Campbell, Irving, TX (US); Ajay Padmakar Deo, Carrollton, TX (US); Sam Eric McMurry, Richardson, TX (US)

(73) Assignee: Tekelec, Inc., Morrisville, NC (US)

( * ) Notice: Subject to any disclaimer, the term of this patent is extended or adjusted under 35 U.S.C. 154(b) by 104 days.

This patent is subject to a terminal disclaimer.

(21) Appl. No.: 12/986,118

(22) Filed: Jan. 6, 2011

(65) Prior Publication Data
US 2011/0167172 A1 Jul. 7, 2011

Related U.S. Application Data

(60) Provisional application No. 61/292,842, filed on Jan. 6, 2010.

(51) Int. Cl.
*G06F 15/16* (2006.01)
*G06F 15/173* (2006.01)
(52) U.S. Cl.
USPC .......................................... 709/203; 709/223
(58) Field of Classification Search
USPC .................. 709/239, 202, 224, 226
See application file for complete search history.

(56) References Cited

U.S. PATENT DOCUMENTS

| 5,768,523 | A | 6/1998 | Schmidt |
| 7,801,986 | B2 | 9/2010 | Lybeck et al. |
| 8,060,572 | B2 | 11/2011 | Brown et al. |
| 8,499,035 | B2 | 7/2013 | Roach et al. |

(Continued)

FOREIGN PATENT DOCUMENTS

WO  WO 2011/085121 A2  7/2011

OTHER PUBLICATIONS

Wei-Ming Wu et al., A Fast Failure Detection and Failover Scheme for SIP High Availability Networks, Conference Publications, Dec. 17-19, 2007, pp. 187-190.*

(Continued)

*Primary Examiner* — Oscar Louie
*Assistant Examiner* — Olanrewaju Bucknor
(74) *Attorney, Agent, or Firm* — Jenkins, Wilson, Taylor & Hunt, P.A.

(57) ABSTRACT

Methods, systems, and computer readable media system for collecting and distributing session initiation protocol (SIP) event watcher entity subscription information in a communications network are disclosed. According to one aspect, the method includes receiving, at a first notifier server from a watcher entity client, a first subscription request for SIP event information associated with one or more watched entity clients. The method also includes receiving, at a watcher information (WINFO) entity, SIP event subscription information that includes an identifier indicating that the first notifier server serves the watcher entity client, storing the SIP event subscription information in the WINFO entity, detecting the unavailability of the first notifier server. The method further includes sending an instruction message, based on the identifier in the stored SIP event subscription information, to direct the watcher entity to generate a second subscription request associated for the SIP event information.

24 Claims, 10 Drawing Sheets

(56) References Cited

U.S. PATENT DOCUMENTS

| | | | |
|---|---|---|---|
| 2002/0035605 A1 | 3/2002 | McDowell et al. | |
| 2002/0055967 A1 | 5/2002 | Coussement | |
| 2002/0055975 A1 | 5/2002 | Petrovykh | |
| 2002/0062345 A1* | 5/2002 | Guedalia et al. | 709/204 |
| 2002/0073150 A1 | 6/2002 | Wilcock | |
| 2003/0041101 A1 | 2/2003 | Hansche et al. | |
| 2003/0215080 A1* | 11/2003 | Wengrovitz | 379/219 |
| 2003/0217142 A1 | 11/2003 | Bobde et al. | |
| 2004/0133641 A1* | 7/2004 | McKinnon et al. | 709/204 |
| 2005/0289097 A1* | 12/2005 | Trossen et al. | 707/1 |
| 2008/0065652 A1* | 3/2008 | McCann et al. | 707/100 |
| 2008/0137531 A1* | 6/2008 | Tal-Aviv et al. | 370/221 |
| 2009/0106437 A1* | 4/2009 | Mostafa et al. | 709/230 |
| 2009/0143086 A1 | 6/2009 | Jeong | |
| 2009/0177729 A1* | 7/2009 | Ben Ezra et al. | 709/202 |
| 2009/0276522 A1 | 11/2009 | Seidel | |
| 2009/0282005 A1 | 11/2009 | Kim et al. | |
| 2009/0292790 A1* | 11/2009 | Salonikios | 709/217 |
| 2009/0319655 A1* | 12/2009 | Viamonte Sole | 709/224 |
| 2009/0327494 A1* | 12/2009 | Ben-Ezra et al. | 709/226 |
| 2010/0070563 A1* | 3/2010 | Baker et al. | 709/203 |
| 2010/0198742 A1 | 8/2010 | Chang et al. | |
| 2010/0332647 A1* | 12/2010 | Agulnik et al. | 709/224 |
| 2011/0131318 A1* | 6/2011 | Maes | 709/224 |
| 2011/0138054 A1* | 6/2011 | Ben-Ezra et al. | 709/226 |
| 2011/0167152 A1* | 7/2011 | Roach et al. | 709/224 |

OTHER PUBLICATIONS

Yun-Jung Cheng et al., Efficient Failover and Load Balancing forDependable SIP Proxy Servers, Computers and Communications, 2008. ISCC 2008. IEEE Symposium, Jul. 6-9, 2008, pp. 1153-1158.*

Rosenberg T, A Watcher Information Event Template-Package for the Session Initiation Protocol (SIP), The Internet Society (2004), pp. 1-21.*

Notification of Transmittal of the International Search Report and the Written Opinion of the International Searching Authority, or the Declaration for International Applicaton No. PCT/US2011/020407 (Sep. 26, 2011).

Roach, "Session Initiation Protocol (SIP)—Specific Event Notification," Network Working Group, RFC 3265 (Jun. 2002).

Non-Final Office Action for U.S. Appl. No. 12/985,967 (Aug. 27, 2012).

Notice of Allowance and Fee(s) Due for U.S. Appl. No. 12/985,967 (Apr. 16, 2013).

* cited by examiner

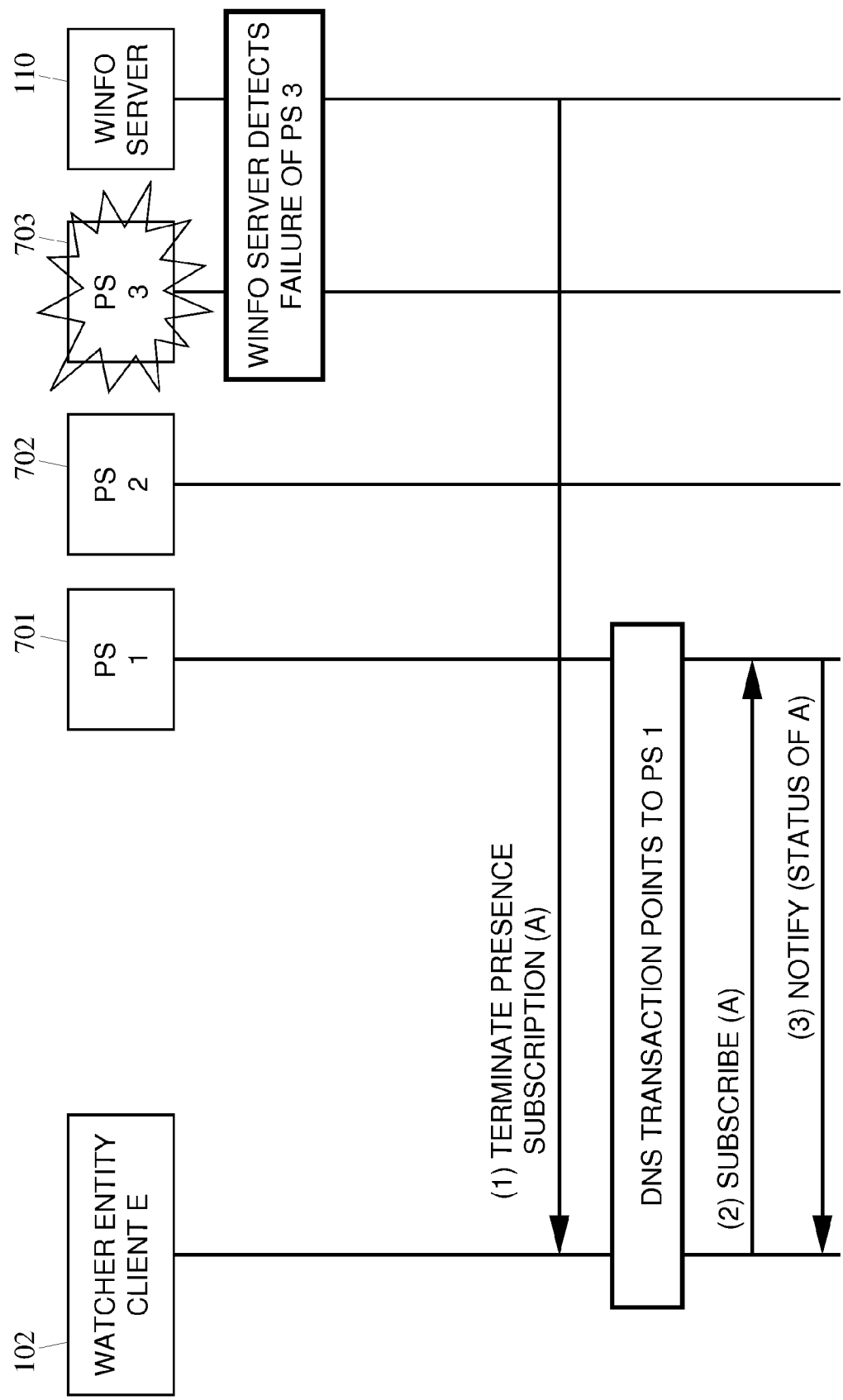

METHODS, SYSTEMS AND COMPUTER READABLE MEDIA FOR PROVIDING A FAILOVER MEASURE USING WATCHER INFORMATION (WINFO) ARCHITECTURE

RELATED APPLICATIONS

The present application claims the benefit of U.S. Provisional Patent Application Ser. No. 61/292,842, filed Jan. 6, 2010, the disclosure of which is incorporated herein by reference in its entirety.

TECHNICAL FIELD

The subject matter described herein relates to session initiation protocol (SIP) event subscription and notification. More particularly, the subject matter described herein relates to systems, methods, and computer readable media for providing a failover measure using watcher information (WINFO) architecture.

BACKGROUND

A session initiation protocol (SIP) event notification system as disclosed in Request for Comments (RFC) 3265 includes a network architecture that permits SIP nodes to request notifications from remote nodes which indicate whether certain events (e.g., change in state information) have occurred in a given end node. Namely, SIP entities may subscribe to the state of a resource associated with a remote node (e.g., a watched subscriber or resource entity), and a notifier node/server associated with the remote node can send a notification if a state change occurs. For example, a SIP entity may send a SIP SUBSCRIBE message to request a SIP event subscription (e.g., a presence state subscription) to a notifier node that services the end node. A notifier node associated with the end node may then be configured to return the current state information (e.g., presence state information) of the node (and updates to the state information) up until the subscription expires. Notably, the SIP events model is a "soft state" model where subscriptions are not permanent and are configured to expire after a predefined amount of time and must be renewed by subsequent subscription (e.g., SIP SUBSCRIBE) messages.

In addition to providing SIP event information associated with watched subscribers or resources, a notifier node/server can also be adapted to provide watcher information (WINFO) to the watched subscriber or resource entity. Problems arise, however, in scenarios where multiple SIP event servers (e.g., presence state servers) are deployed to handle subscription request transactions related to a watched subscriber entity. Namely, responding to watcher information requests become difficult because there isn't a single SIP event server (e.g., a presence server) that has a complete view of all watcher entities that are subscribed to a particular watched entity. In short, multiple SIP event servers may be handling the subscription request transactions related to a single watched subscriber entity. This is particularly problematic because current specifications typically do not allow a watched subscriber entity to discover and contact the full set of servicing SIP event servers in order to acquire all of the watcher subscriber information associated with that requesting watched subscriber entity.

Due to the SIP event notification system's soft state model, other problems may arise in the event a notifier server fails. Any watcher subscriber serviced by the failed notifier server will not know that the notifier server is unavailable and therefore will be unable to receive any SIP event updates (e.g., presence state updates) until the watcher subscriber's SIP event subscription expires. This problematic situation is difficult to detect, especially if it is not unusual for the watcher subscriber to not receive SIP event update messages because the watched entity's status typically does not change. Thus, the problem may continue undetected by the watcher entity for the length of the SIP event subscription. Moreover, even if the watcher subscriber detects the problem and refreshes the subscription, a re-subscribe message may be needlessly sent to the failed notifier server.

Accordingly, there exists a need for improved methods, systems, and computer readable media for providing a failover measure using watcher information (WINFO) architecture.

SUMMARY

According to one aspect, the subject matter described herein includes a system for providing a failover measure using watcher information (WINFO) architecture. In one embodiment, the method includes receiving, at a first notifier server from a watcher entity client, a first subscription request for SIP event information associated with one or more watched entity clients. The method also includes receiving, at a watcher information (WINFO) entity, SIP event subscription information that includes an identifier indicating that the first notifier server serves the watcher entity client, storing the SIP event subscription information in the WINFO entity, detecting the unavailability of the first notifier server. The method further includes sending an instruction message, based on the identifier in the stored SIP event subscription information, to direct the watcher entity to generate a second subscription request associated for the SIP event information.

The subject matter described herein for providing a failover measure using watcher information (WINFO) architecture may be implemented in hardware, software, firmware, or any combination thereof. As such, the terms "function" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 10 is a signaling flow diagram illustrating a watcher information server detecting the failure of an associated presence server according to an embodiment of the subject matter described herein according to an embodiment of the subject matter described herein.

DETAILED DESCRIPTION

Figure 1:
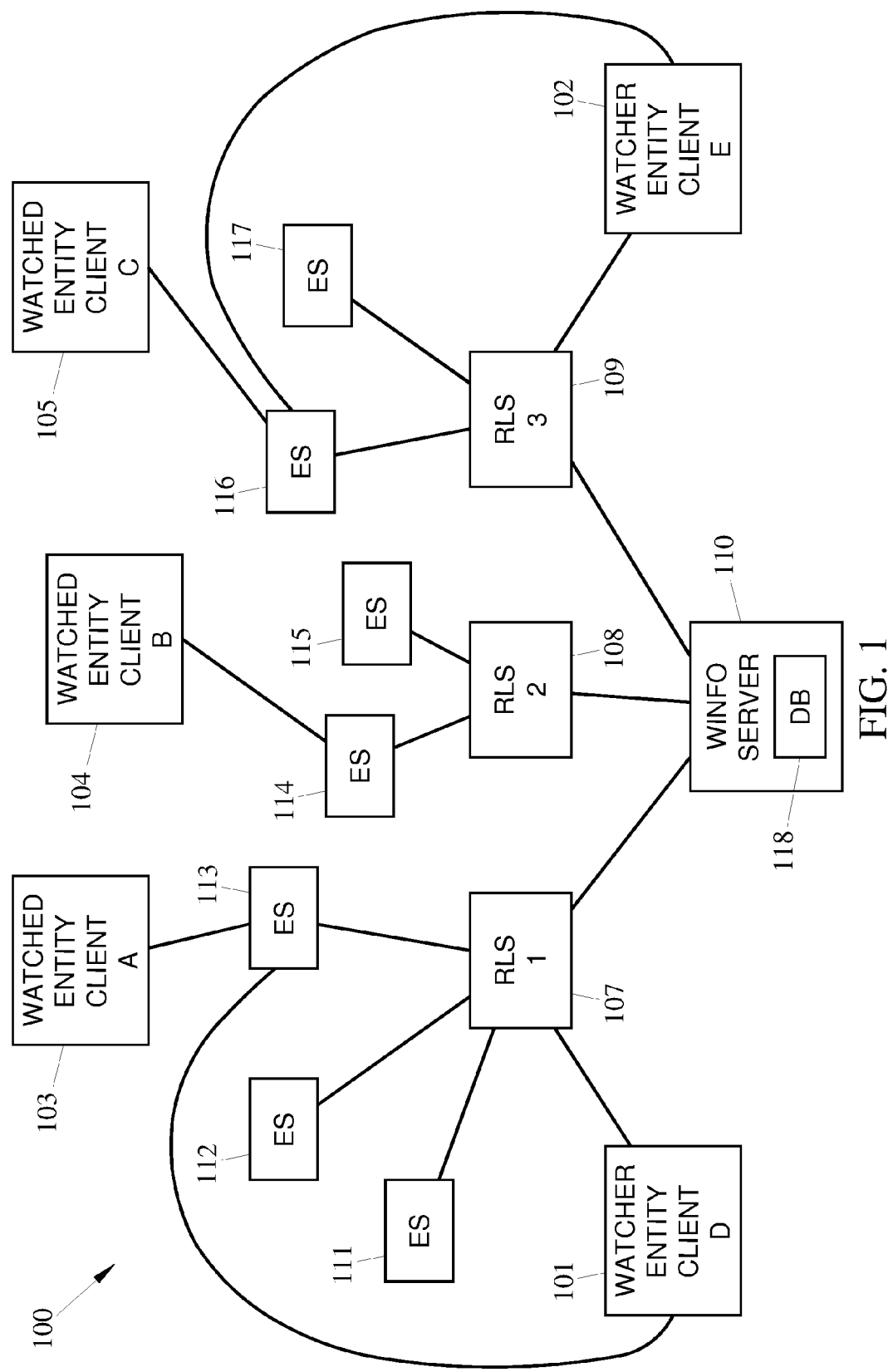
FIG. 1 is block diagram illustrating an exemplary system for providing a failover measure using watcher information (WINFO) architecture according to an embodiment of the subject matter described herein.

FIG. 1 depicts an exemplary communications network 100 that facilitates the failover of SIP notifier servers using a watcher information (WINFO) architecture. In one embodiment, communications network 100 may include watcher entity clients 101-102, watched entity clients 103-105, a plurality of notifier servers (e.g., resource list servers 107-109), a watcher information (WINFO) server 110, and a plurality of SIP event servers 111-117. In general, watcher information (WINFO) server 110 is configured to collect SIP event subscription information from the plurality of notifier servers, such as resource list servers 107-109. Similarly, each of RLS servers 107-109 may be configured to interface with a common event server or a pool of event servers, such as SIP event servers 111-117. In one embodiment as shown in FIG. 1, SIP event servers 111-117 may be presence state service servers, which are responsible for receiving and maintaining presence state information associated with watched entities clients 103-105. Although the present subject matter primarily uses presence service as an exemplary SIP event service, other SIP event services may be handled in a similar fashion by communications network 100 without departing from the scope of the present subject matter. Other SIP event subscription services may include presence subscription service, dialog subscription service, voice mail subscription information, automatic callback subscription service, PSTN and Internet Internetworking (PINT) subscription service, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, XCAP document change information, or any other event packages as that term is defined by RFC 3625 and its successor documents (if any).

In one embodiment, each of watcher entity client 101 and a watcher entity client 102 may comprise a computer, mobile device, or similar client machine configured to run a user agent or client software program, function, or module for accessing network servers. In one embodiment, watcher entity client 101 is associated with a watcher subscriber entity (e.g., watcher subscriber entity D) and is configured to create and send SIP SUBSCRIBE requests to a notifier server entity (e.g., a resource list server or a SIP event server, depending on the embodiment). The SIP SUBSCRIBE requests are subscription messages that request a SIP event subscription for change in state notifications related to one or more watched entities. In one embodiment, the SIP event subscriptions may include presence state service subscriptions (e.g., a SIP request to add a watched subscriber entity to a watcher subscriber entity's "buddy list"). In a SIP event notification architecture, these subscription requests require approval from watched entity clients. As shown in FIG. 1, a watcher entity client (e.g., client 101) may have a direct association or connection to a SIP event server (e.g., event server 113). It should also be noted that network 100 may include watcher clients that are subscribed to RLSs and SIP event servers, concurrently.

Similarly, each of watched entity client 103, watched entity client 104, and watched entity client 105 may comprise a computer, mobile device, or similar client machine configured to run a user agent or client software program, function, or module for accessing network servers. In one embodiment, watched entity client 103 is associated with a watched subscriber entity (e.g., watched subscriber A) and is configured to provide SIP event information (e.g., presence state information and updates) to a designated SIP event server 113 (e.g., presence server). Although not explicitly shown in FIG. 1, watched entity client 103 may be configured to send to a notifier server (e.g., RLS 107) SIP messages that request watcher entity information associated with watched entity A (e.g., watched entity client 103 requests a list of watcher entities that are either receiving the presence state information related to watched entity A or have requested to subscribe to watched entity A's presence information).

FIG. 1 also depicts a plurality of SIP event servers 111-117. As shown in FIG. 1, each of SIP event servers 111-117 may be communicatively coupled to an RLS server. In one embodiment, a SIP event server may be a presence server that is configured to collect and manage the presence state information of a watched subscriber entity and provide current presence state information and present state updates to one or more RLSs. In an alternate embodiment, communications network 100 may not employ RLSs 107-109. In such a case, SIP event servers 111-117 may function as notifier servers and directly communicate with watcher and watched entities. SIP event servers 111-117 may also be configured to provide watcher entity subscription information to WINFO server 110 when RLS servers are not employed in network 100.

In one embodiment, SIP event servers 111-117 collect SIP event state data from a plurality of watched subscriber or resource entities (e.g., watched entities 103-105). In one embodiment, a SIP event server may be a presence server that receives presence state information from one or more watched entities. For example, watched entity 103 may provide presence state information by publishing its current presence state using a status string and providing this information to SIP event server 113 (which in this case is a presence service server). In response to receiving the presence state information, SIP event server 113 may serve a "presence state document" to presence subscribers (i.e., watcher entities) of watched subscriber entity 103 or to RLSs. Presence server 103 is also configured to receive XML based presence rules from watched subscriber entity A. In one embodiment, SIP event server 113 maintains a set of presence rules for each subscription to each resource device. For example, the presence rules associated with watched subscriber entity 103 may be modified such that a unique set of presence rules may exist for each of the watcher entities of watched subscriber entity A. For example, subscription refresh rules and/or the type of presence state information provided to one watcher entity client may differ from what is provided to a second watcher entity client. Moreover, a presence server may also be configured to receive publication information from different presence sources associated with the same watched subscriber entity. For example, presence server 113 may receive presence state updates related to watched subscriber A's client devices in the form of GPS location data, a text string, or a Web server connected to a calendar.

In one embodiment, a SIP event server such as a presence server may be configured to detect the failure of any other presence server in network 100. For example, referring briefly to FIG. 9 (more details below), a first presence server 701 and presence server 703 may be designated mates that communicate ping messages or are connected by a proprietary bus to periodically monitor the availability of the other presence server. Upon detecting the failure (e.g., failed presence server is congested, unreachable, taken out of service, etc.) of presence server 703, presence server 701 may transmit a message to a WINFO server that requests the active subscription information for presence server 703. The active subscription information includes SIP event state subscriptions that were previously serviced by presence server 703. The WINFO server may respond to the request from presence server 701 by sending a message containing the necessary SIP event subscription state information that was managed by failed presence server 703. After receiving the requested SIP event subscription state information, presence server 701 contacts the watcher entity subscribers (e.g., watcher client 102) that were being served by presence server 703 by sending an instruction message causing these former presence server 703 subscribers to re-subscribe. In one embodiment, the instruction message includes a SIP terminate presence subscription message that lists the watched subscribers for which a new SIP event subscription needs to be sent. The contacted watcher entity clients (e.g., watcher client 102) then contacts a DNS server to obtain the serving presence server address information. The DNS server then points the watcher subscribers to a designated RLS server. In one embodiment, when the watcher entity client wishes to contact a SIP entity using its DNS name, the watcher entity client performs a three step/level lookup (i.e., a first step for DNS NAPTER records, a second step for DNS SRV records, and a third step for DNS A or AAAA records). The result obtained in the second step includes a list of servers which enables the watcher entity client to contact the presence servers in a particular order until a connection is made. Thus, presence server 701 may be contacted despite the failed state of presence server 703. In yet another embodiment, the re-subscription attempt may traverse a proxy. The proxy may have up-to-date information regarding which SIP event servers are currently online so that the proxy is capable of directing the subscription to an appropriate (online) event server according to its own internal logic. Please note that although depicted as such in FIG. 9, the presence server that detects the failed presence server is not required to be the designated failover presence server.

FIG. 1 also depicts a plurality of resource list servers (RLSs) 107-109 that function as notifier server entities in communications network 100. Although only three RLSs are depicted in FIG. 1, any number of RLSs may be employed without departing from the scope of the present subject matter. In an alternate embodiment, network 100 may also utilize zero RLS entities and instead only employ presence servers. In one embodiment, RLS 107 functions as a notifier server in communications network 100 that receives SIP SUBSCRIBE requests sent by one or more watcher entity clients, e.g., watcher client 101. Similarly, RLS 107 may also generate SIP NOTIFY messages for the purpose of informing watcher entity client 101 or any other watcher subscriber or resource entity of the state (or change in state) of a watched resource (e.g., the current presence state of a watched subscriber entity).

Typically, a resource list server (RLS) is used to store a list of watched subscriber or resource entities in which a watcher entity is interested in knowing "change in state" information. For example, an associated watcher entity client may create a resource list (e.g., a buddy list) of watched entities that is stored in an RLS. The watcher entity client may then subscribe to the list in order to obtain SIP event information (e.g., presence state information) and updates regarding the watched subscribers on the list. Upon receiving the resource list from the watcher client, the RLS attempts to acquire the SIP event information by communicating with the SIP event servers that maintain the requested SIP event information. After obtaining the SIP event information, the RLS sends a SIP NOTIFY message to the watcher entities with the current SIP event states of the different watched entities. Also, prior to the SIP event subscription expiring, an RLS may also be configured to send SIP event state updates to the watcher entities after the RLS receives the updates from the event servers. In the present subject matter, however, an RLS may be used to provide SIP event subscription information to WINFO server 110. The RLS creates the SIP event subscription information from receiving subscription requests from watcher entities requesting a subscription to change in state information pertaining to one or more watched entities. An RLS server may also be configured to request watcher entity subscription information on behalf of a requesting watched entity. For example, RLS 107 may receive a request for watcher information from a watched entity client 103 associated with a watched subscriber A. RLS 107 may then subsequently forward that request to WINFO server 110.

In one embodiment, an RLS may be configured to detect the failure of any other RLS in network 100. For example, referring briefly to FIG. 5 (more details below), RLS 107 and RLS 109 may be designated mates that communicate ping messages or are connected by a proprietary bus to periodically monitor the availability of the other RLS. Upon detecting the failure (e.g., failed RLS is congested, unreachable, taken out of service, etc.) of RLS 109, RLS 107 may transmit a message to a WINFO server that requests the active subscription information for RLS 109. The active subscription information includes SIP event state subscriptions that were previously serviced by RLS 109. The WINFO server may respond to the request from RLS 107 by sending a message containing the necessary SIP event subscription state information that was managed by failed RLS 109. After receiving the requested SIP event subscription state information, RLS 107 contacts the watcher entity subscribers (e.g., watcher client 102) that were being served by RLS 109 by sending an instruction message causing these former RLS 109 subscribers to re-subscribe. In one embodiment, the instruction message includes a SIP terminate presence subscription message that lists the watched subscribers for which a new SIP event subscription needs to be sent. The contacted watcher entity clients (e.g., watcher client 102) then contacts a DNS server to obtain the serving RLS address information. The DNS server then points the watcher subscribers to a designated RLS server. In yet another embodiment, the re-subscription attempt may traverse a proxy. The proxy may have up-to-date information regarding which SIP event servers are currently online so that the proxy is capable of directing the subscription to an appropriate (online) event server according to its own internal logic. Please note that although depicted as such in FIG. 5, the presence server that detects the failed presence server is not required to be the designated failover presence server.

In one embodiment, watcher information (WINFO) server 110 is a designated server, network element, or node that is configured to receive SIP event subscription information from notifier servers, such as an RLS or SIP event server depending on the embodiment. Notably, the SIP event subscription information is generated by an RLS or SIP event server and may include which watcher entities are subscribed to, or have requested a subscription to, the SIP event information and updates pertaining to one or more watched entities. In one embodiment, the SIP event subscription information communicated to WINFO server 110 includes watcher entity identifiers, watched subscriber entity identifiers, subscription details, and other information that identifies the sending notifier server. Upon receipt, WINFO server 110 provisions a database 118 with the communicated SIP event subscription information.

WINFO server 110 may also be configured to manage and distribute a specific portion of the SIP event subscription information (as watcher entity subscription information) to requesting watched entities. Specifically, after being provisioned with the SIP event subscription information, WINFO server 110 may receive requests for watcher entity identification information from watched entities via an RLS server. For example, RLS server 107 receives requests for watcher information from a watched subscriber entity. RLS server 107 then forwards the watcher entity information request from the watched subscriber entity to WINFO server 110 (which is authoritative for the requesting subscriber).

In one embodiment, watcher information (WINFO) server 110 may be configured to handle WINFO SIP metadata event packages. A WINFO event package allows a watched entity client (e.g., watched entity client 103) associated with a watched subscriber (e.g., watched subscriber A) to subscribe and obtain watcher entity subscription information that identifies one or more watcher entities that are subscribed to receive (or have made a request to receive) the watched subscriber's presence information. Notably, a WINFO event package or "WINFO document" is created and sent to the requesting watched entity client so as to notify the associated watched subscriber of the watcher entities that are subscribed to the presence state information related to the watched subscriber entity or attempting to add that watched subscriber entity to a buddy list. In one embodiment, the WINFO document includes a list of subscribed watcher entities and further indicates 1) which watcher entities are presently "online" and/or have associated watcher entity clients running, 2) a list of watcher entities that have issued a subscription request to the watched subscriber entity's presence information, 3) the amount of time remaining for all outstanding presence state subscriptions, 4) and a list of all SIP event subscriptions that are currently in a pending state (i.e., not approved).

In one embodiment, the WINFO server is configured to receive messages from a notifier server (e.g., an RLS or SIP event server) that requests active SIP event subscription information for a detected failed notifier server. The WINFO server may be similarly configured to access its database in order to obtain the active SIP event subscription information of the failed notifier server and subsequently provide the SIP event subscription information to the requesting notifier server in a SIP based response message. In one embodiment, the WINFO server may be configured to detect the failure of a notifier server in network 100, rather than a notifier server that has been previously designated as a mate to the failed notifier server. As such, the WINFO server may also be configured (instead of the designated failover notifier server) to send a terminate presence subscription message to the identified watcher subscribers formerly serviced by the failed notifier server.

The advantage of using a WINFO server in a communications network is that subscription permissions may be eased. Furthermore, the use of different overload queuing techniques may be employed since the amount of subscription traffic at the WINFO server is considerably smaller as compared to a SIP event server (e.g., only the watched entity will be subscribing to a WINFO server for watcher information that is associated with the requesting watched subscriber). Furthermore, the logic associated with accepting and enforcing subscriptions may be generated and supported with greater ease. Although FIG. 1 only depicts a single WINFO server 110 that is authoritative of watched entities 103-105, additional WINFO servers authoritative of additional watched entities may be utilized in communications network 100 without departing from the scope of the present subject matter.

Figure 2:
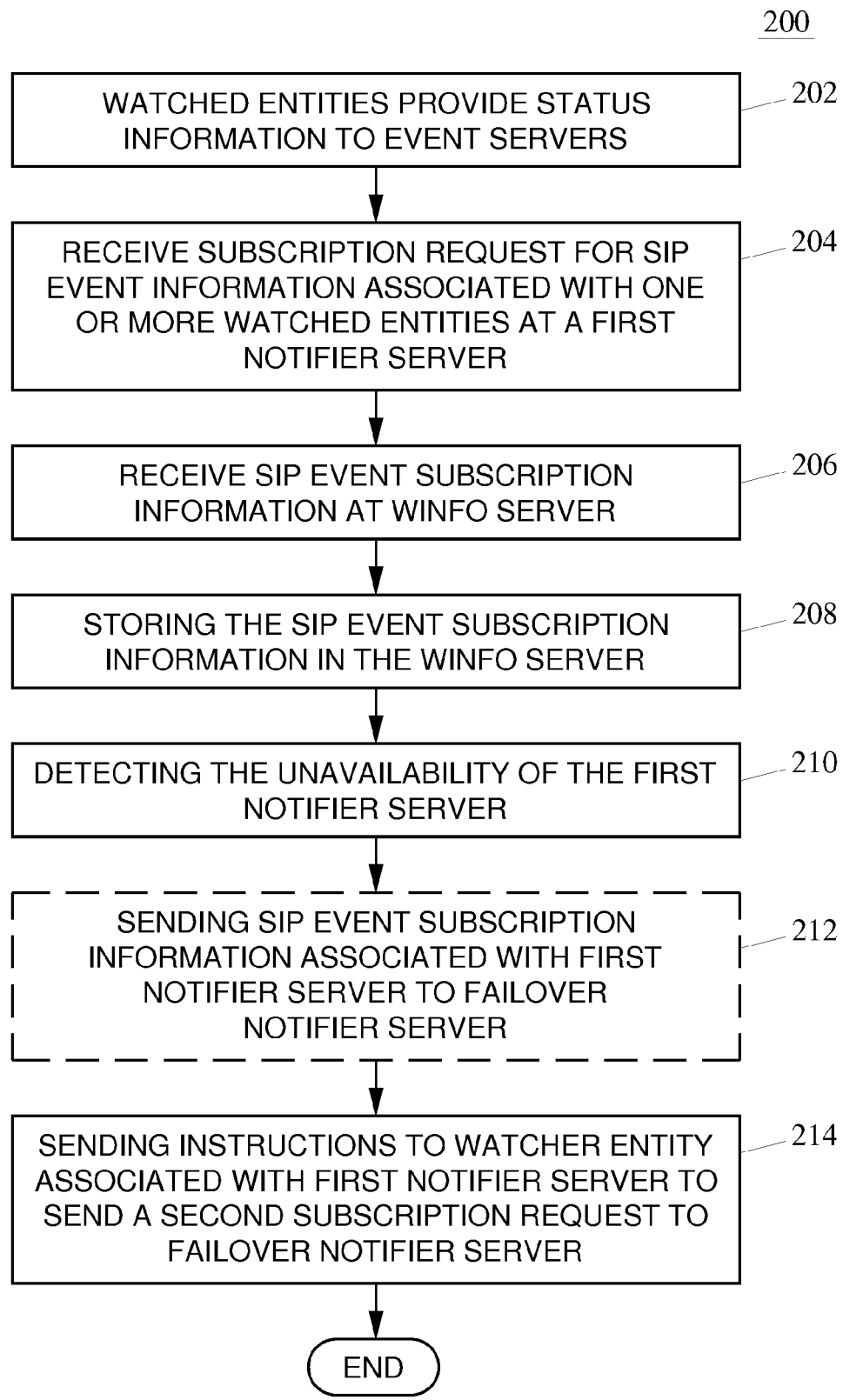
FIG. 2 is a flow chart illustrating an exemplary process for providing a failover measure using watcher information (WINFO) architecture according to an embodiment of the subject matter described herein.

FIG. 2 is a flow chart illustrating an exemplary method 200 for providing a failover measure in a communications network that includes a plurality of notifier servers according to an embodiment of the subject matter described herein. In block 202, event servers are provisioned with SIP event status information from one or more clients associated with watched entities. In one embodiment, the SIP event servers may include presence service servers, each of which is provisioned with presence status information from the plurality of watched subscriber entities over a period of time. In one embodiment, a presence server receives presence information when the client of a watched subscriber entity publishes its current state with a status string.

Figure 3:
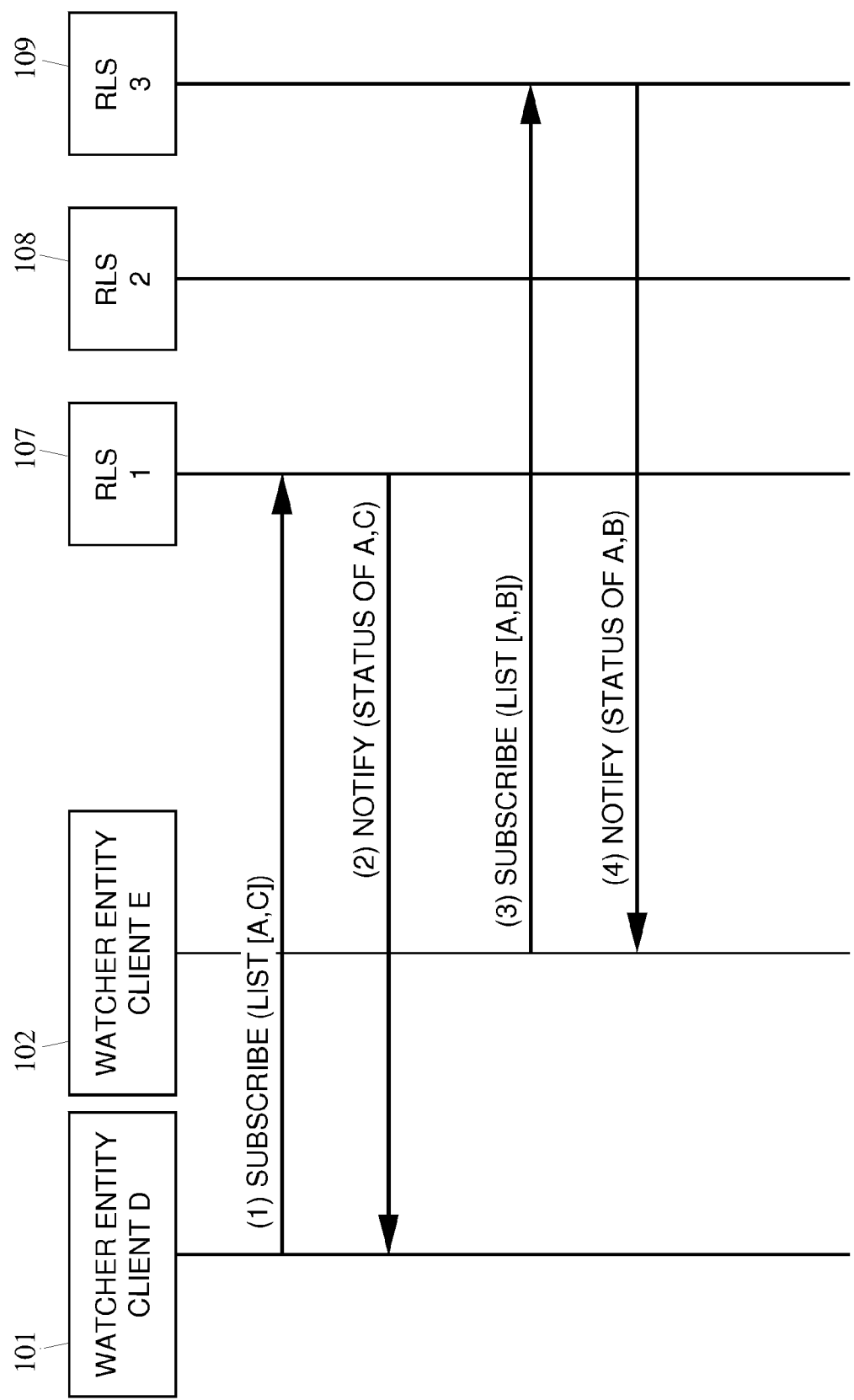
FIG. 3 is a signaling flow diagram illustrating a resource list server receiving a request for presence state information according to an embodiment of the subject matter described herein.

In block 204, a subscription request for SIP event information associated with one or more watched entities is received at a notifier server, such as an RLS, or alternatively, a presence server if an RLS is not utilized in the network. In one embodiment, an RLS server may receive a presence service subscription request message from a client associated with a watcher entity. For example, FIG. 3 depicts a signaling diagram in which watcher entity client 101 sends a presence service subscription request message (i.e., a SUBSCRIBE message) to RLS 107. Namely, the presence service subscription request message sent to RLS 107 indicates that watcher entity client 101 wants to subscribe to presence status information for watched entities A and C. In one embodiment, the SUBSCRIBE message includes a list of identifiers associated with watched entities A and C. Similarly, FIG. 3 also depicts a watcher entity client 102 that sends, to RLS 109, a presence service subscription request message (i.e., a SUBSCRIBE message) for subscribing to presence status information for watched entities A and B. FIG. 3 also shows RLS 107 replying to the SUBSCRIBE message with a NOTIFY message, which indicates the presence status of watched entities A and C. RLS 107 may send the NOTIFY message to watcher entity client 101 if RLS 107 already has the current present state information for watched entities A and C stored locally. Otherwise, RLS 107 may either obtain the presence state information from the appropriate presence servers (e.g., by issuing back-end presence service subscription requests) or may collect derive the presence data in the same manner as a presence server.

Figure 4:
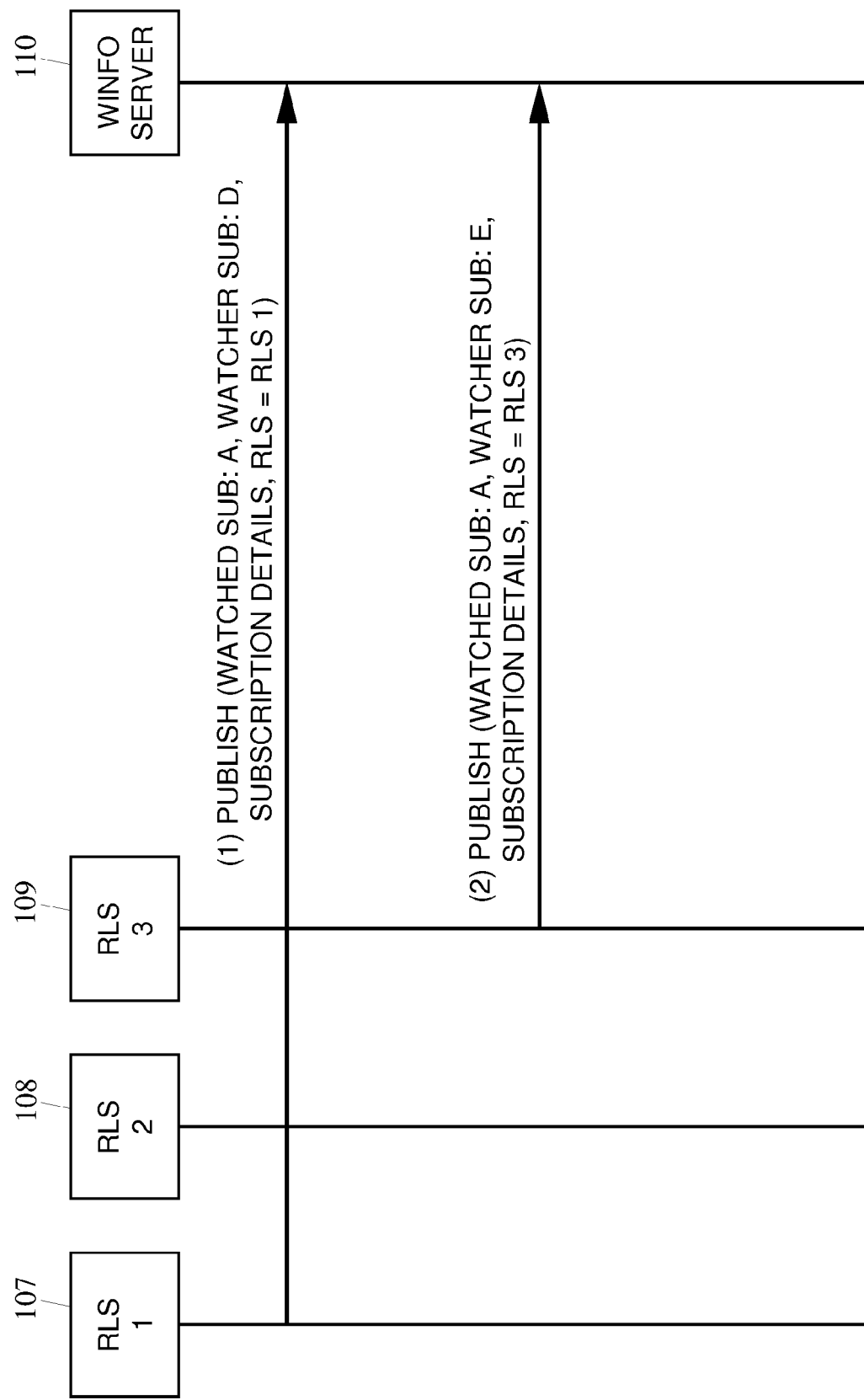
FIG. 4 is a signaling flow diagram illustrating a watcher information (WINFO) server receiving presence subscription information according to an embodiment of the subject matter described herein.

Returning to FIG. 2, in block 206, SIP event subscription information associated with the subscription request is received at a WINFO server. In one embodiment, a WINFO server 110 receives presence subscription information associated with a subscription request previously sent to RLS 107. For example, FIG. 4 depicts RLS 107 communicating presence subscription information to WINFO server 110, which may be authoritative for watcher entity A. Although FIG. 4 depicts an RLS 107 sending a SIP PUBLISH message to communicate the presence subscription information, it should be understood that any other similar mechanism or message may be utilized without departing from the scope of the present subject matter. Specifically, FIG. 4 illustrates that the presence subscription information received by WINFO server 110 includes a watcher entity identifier (for watcher entity D), a watched entity identifier (for watched subscriber A), and subscription details. In one embodiment, the subscription details may include the SIP subscription dialog information (e.g., To and From header field values including tags, Call-ID, remote and local CSeq values, remote and local Contact values, and route-set), the current subscription status, the most recent event affecting the subscription status, and the remaining subscription duration. Similarly, FIG. 4 also depicts RLS 109 communicating a SIP PUBLISH message that includes a second set of presence subscription information to WINFO server 110. Specifically, the presence subscription information from RLS 109 is shown to include a watcher entity identifier (for watcher entity E), watched entity identifier (for watched entity A), and subscription details. Notably, FIG. 4 shows that WINFO server 110 may receive presence service subscription information related to watched subscriber entity A from more than one notifier server source (e.g., an RLS or SIP event server).

Returning to FIG. 2, in block 208, the SIP event subscription information is stored in a WINFO server. In one embodiment, the presence service subscription information received by WINFO server 110 is stored in a database 118 (as shown in FIG. 1). For example, an exemplary database 118 may include a column that contains watched entity identifiers (i.e., watched subscriber identifiers), a column that includes watcher entity identifiers (i.e., watcher subscriber identifiers), and a column includes identifiers corresponding to the RLSs serving the respective watcher entities. Although only three columns are described, additional columns may be included in database 118 without departing from the scope of the present subject matter. Notably, the SIP event subscription information stored in the WINFO server includes sufficient information to know what SIP event subscriptions a notifier server is serving, but not enough information for a failover notifier server to resume the session. For example, the stored information is established at the beginning of the subscription, and is invariant for the duration of the subscription. Thus, this information only needs to be sent once (at the beginning of the subscription), and removed once at the end of the session. The information necessary to resume a session would require data replication for every SIP message that is sent or received for that subscription. Thus, the volume of replication data to accomplish this is not feasible. However, by maintaining the amount of information proposed by the present subject matter, the WINFO server is permitted to send subscription termination messages.

Figure 5:
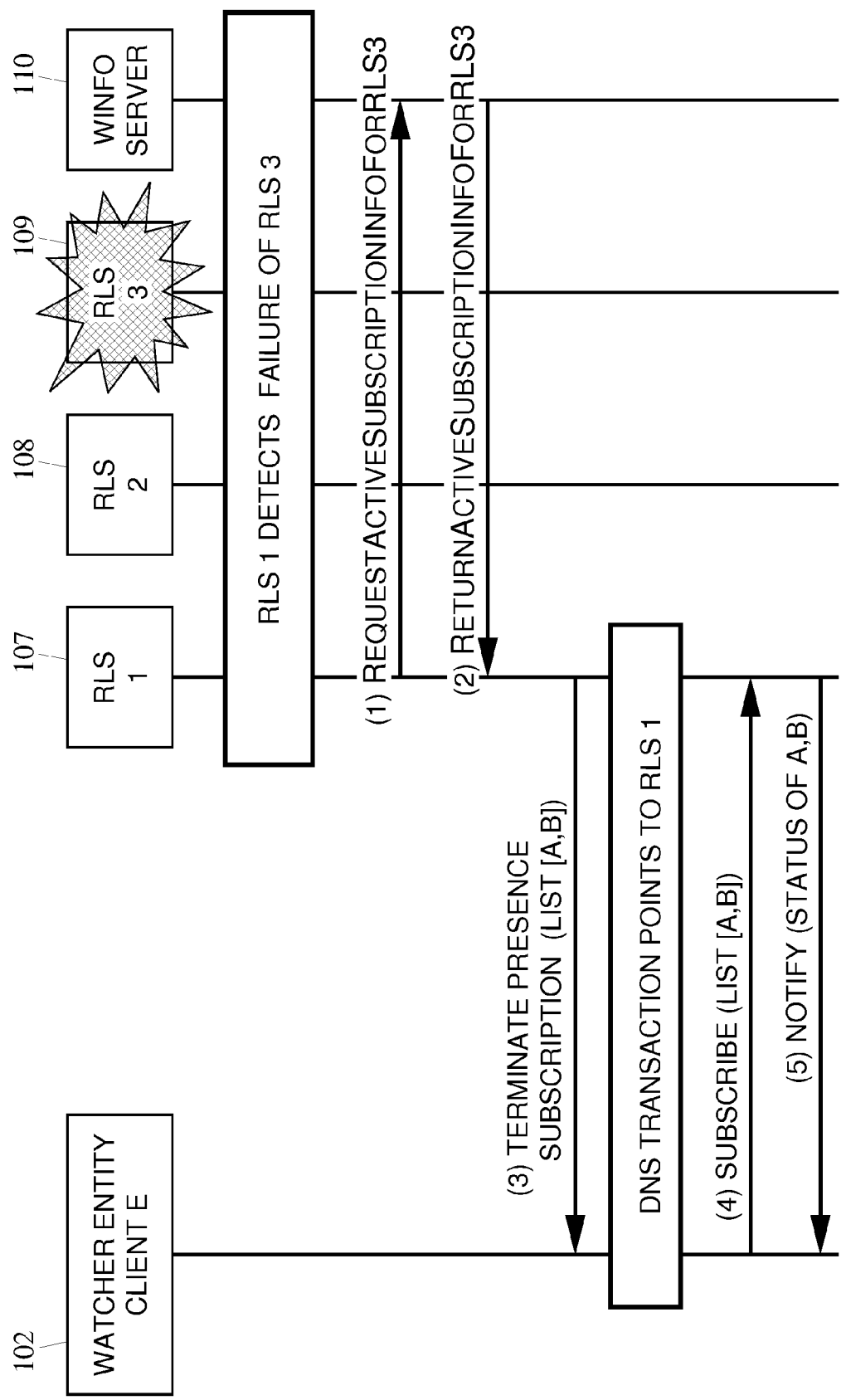
FIG. 5 is a signaling flow diagram illustrating a resource list server detecting the failure of an associated resource list server according to an embodiment of the subject matter described herein.
Figure 6:
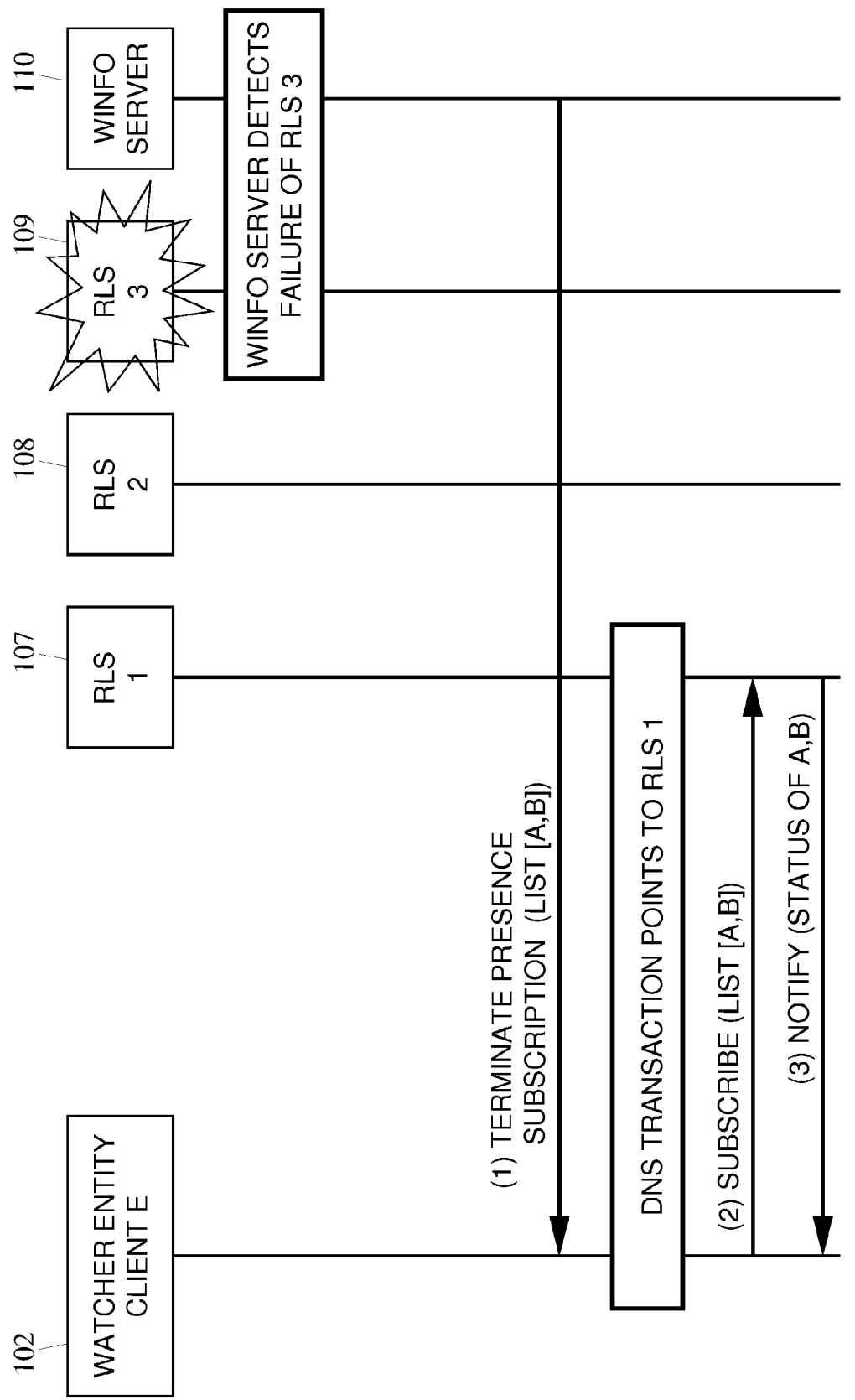
FIG. 6 is a signaling flow diagram illustrating a watcher information server detecting the failure of an associated resource list server according to an embodiment of the subject matter described herein according to an embodiment of the subject matter described herein.

Returning to FIG. 2, in block 210, the unavailability of a first notifier server is detected. In one embodiment, a first notifier becomes unavailable (e.g., by failing, becomes congested, becomes unreachable, or taken out of service). The unavailability condition is subsequently detected by another notifier server (e.g., a designated notifier server mate) or a WINFO server in network 100. For example, in FIG. 5, RLS 109 fails and becomes unavailable to communicate with any other network element. RLS 107 (or any other RLS that may be designated as a notifier server mate) subsequently detects the unavailability of RLS 109. RLS 107 may be configured to detect RLS 109 as being unavailable by any manner, such as a failed ping messages, a notification message sent by WINFO server 110 to RLS 107, or via a proprietary bus connecting the RLSs. In an alternate embodiment, WINFO server 110 may be configured to detect the failure of an RLS (such as RLS 109) as shown in FIG. 6. In one embodiment, a detection module may be configured to detect the unavailability of the first notifier server. The detection module may reside in or be co-located with a second notifier server (e.g., an RLS or presence server). In another embodiment, the detection module may be a stand-alone network entity or element.

Returning to FIG. 2, in block 212, SIP event subscription information associated with an unavailable first notifier server is sent to a designated failover notifier server. The designated failover notifier server may be the notifier server designated as the detecting server or any other RLS server in network 100. As shown in FIG. 5, RLS 107 obtains SIP event subscription information from WINFO server 110 for the subscriptions that were previously serviced by failed RLS 109. In one embodiment, RLS 107 initiates contact with WINFO server 110 and requests the SIP event subscription information associated with failed RLS 109. WINFO server 110 may respond to the request from RLS 107 with the necessary SIP event state information. In this embodiment, the SIP event subscription information includes presence subscription state information that was managed by RLS 109. For example, WINFO server 110 may access database 118 (as shown in FIG. 1) to locate stored watcher entity subscription information that was handled by RLS 109. WINFO server 110 may then query database 118 in order to obtain an identifier for each of the watcher entities that were serviced by unavailable RLS 109. Notably, block 212 is an optional step (i.e., not necessary) if WINFO server 110 is instead configured to send a terminate subscription message directly to the watcher entity.

Returning to FIG. 2, in block 214, instructions are sent to watcher entities associated with the unavailable first notifier server. The sent instructions direct the watcher entities to send a new subscription request to a failover notifier server. In one embodiment, as shown in FIG. 5, WINFO 110 contacts the watcher entity clients that were formerly serviced by RLS 109, such as watcher entity client 102. For example, RLS 107 sends a message (e.g., a SIP-based terminate presence subscription message) that instructs watcher entity client 102 to terminate current presence subscriptions formerly serviced by RLS 109 (e.g., watched subscribers A and B) and to send a new subscription message in order to re-subscribe for presence information associated with watched subscriber entities A and B. When the watcher entities contact a DNS server to obtain the serving RLS address information, the DNS server points the watcher entities to a new RLS, e.g., RLS 107. Please note that although FIG. 5 shows that RLS 107 detected the unavailability of RLS 109 as well as being designated as the new serving (i.e., failover) RLS, this is not required and is only one exemplary illustration of the present subject matter. For example, RLS 108 could have been designated as the RLS responsible for detecting the unavailability of RLS 109 with RLS 107 still being the designated failover notifier server (and vice versa). In one embodiment, the detector module may be configured to send the instructions to direct the watcher entities to send a new subscription request to a failover notifier server. As mentioned above, the detector module may reside in or be co-located with a second notifier server (e.g., an RLS or presence server). In another embodiment, the detector module may be a stand-alone network entity or element.

In an alternate embodiment, the detection of failed RLS 109 (block 210) and the sending of instruction messages to watcher entity client 102 (block 214) may be performed by WINFO server 110 itself instead of the failover RLS 107. For example, FIG. 6 depicts RLS 109 failing and thereby becoming unavailable to communicate with any other network element. WINFO server 110 subsequently detects the unavailability of RLS 109. WINFO server 110 may be configured to detect RLS 109 as being unavailable by any manner, such as a failed ping messages or via a proprietary bus connecting the RLS with the WINFO server. WINFO 110 then determines and contacts the watcher entity clients that were formerly serviced by RLS 109, such as watcher entity client 102, by accessing database 118. For example, WINFO 110 subsequently sends a message (e.g., a SIP-based terminate presence subscription message) that instructs watcher entity client 102 to terminate its current presence subscriptions formerly serviced by RLS 109 (e.g., watched subscribers A and B) and to send a new subscription message in order to re-subscribe for presence information associated with watched subscriber entities A and B. When watcher entity client 102 contacts a DNS server in order to obtain the serving RLS address information, the DNS server points the watcher entity client 102 to a new failover RLS, e.g., RLS 107. Please note that although FIG. 6 shows that RLS 107 detected the unavailability of RLS 109 as well as being designated as the new serving (i.e., failover) RLS, this is not required and is only one exemplary illustration of the present subject matter. For example, RLS 108 could have been designated as the RLS responsible for detecting the unavailability of RLS 109 with RLS 107 still being the designated failover notifier server (and vice versa).

Figure 7:
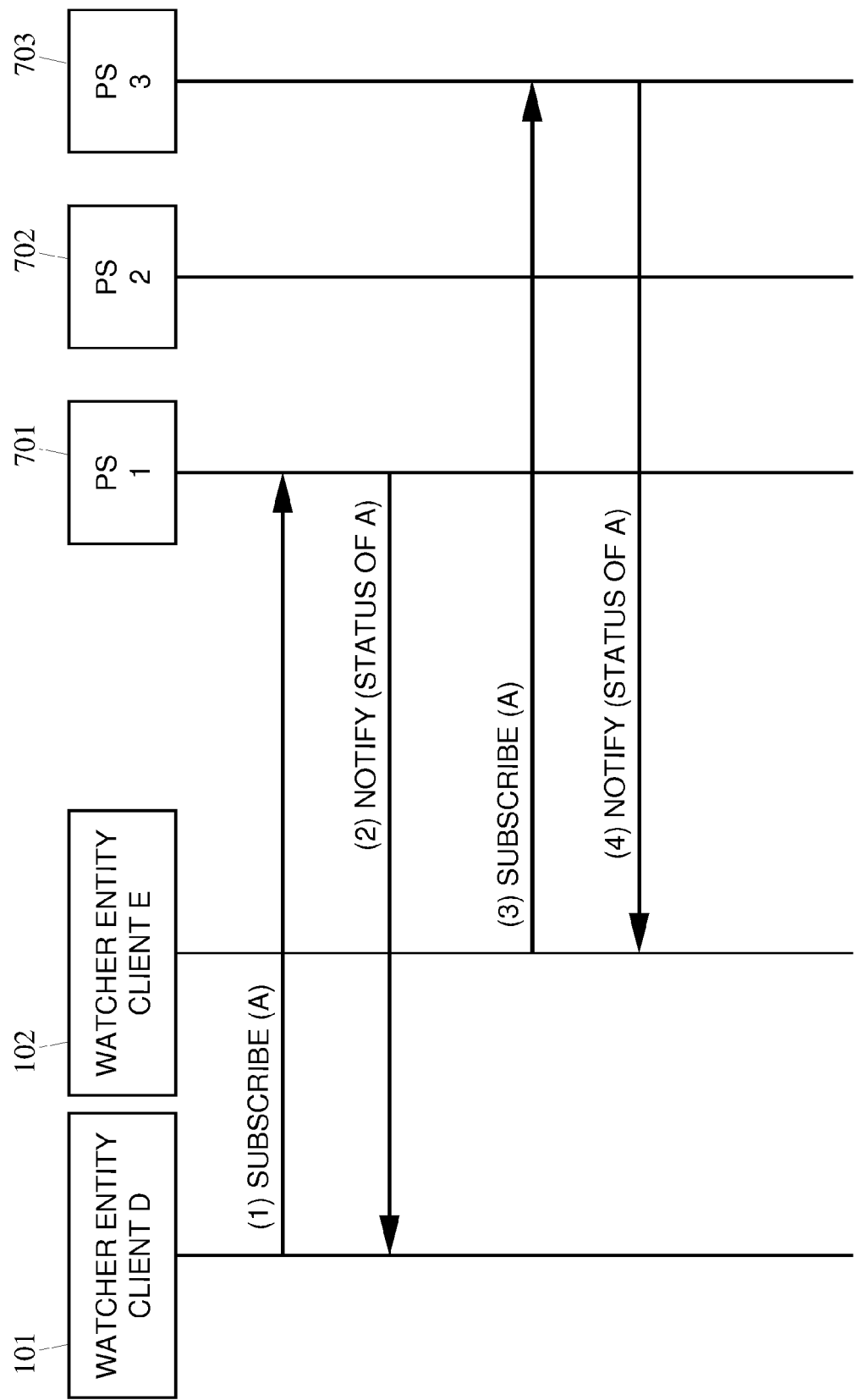
FIG. 7 is a signaling flow diagram illustrating a presence server receiving a request for presence state information according to an embodiment of the subject matter described herein.

As mentioned above with regard to at least one embodiment, communications network 100 may employ notifier servers that include presence servers instead of utilizing RLSs. For example, FIG. 7 depicts a signaling diagram in which watcher entity client 101 sends a presence service subscription request message (i.e., a SUBSCRIBE message) to presence server 701. Namely, the presence service subscription request message sent to presence server 701 indicates that watcher entity client 101 wants to subscribe to presence status information for watched entity A. In one embodiment, the SUBSCRIBE message includes an identifier associated with watched entity A. Similarly, FIG. 7 also depicts a watcher entity client 102 that sends, to RLS 703, a presence service subscription request message (i.e., a SUB-SCRIBE message) for subscribing to presence status information for watched entity A. FIG. 7 also shows presence server 701 replying to the SUBSCRIBE message using a NOTIFY message, which indicates the presence status of watched entity A.

Figure 8:
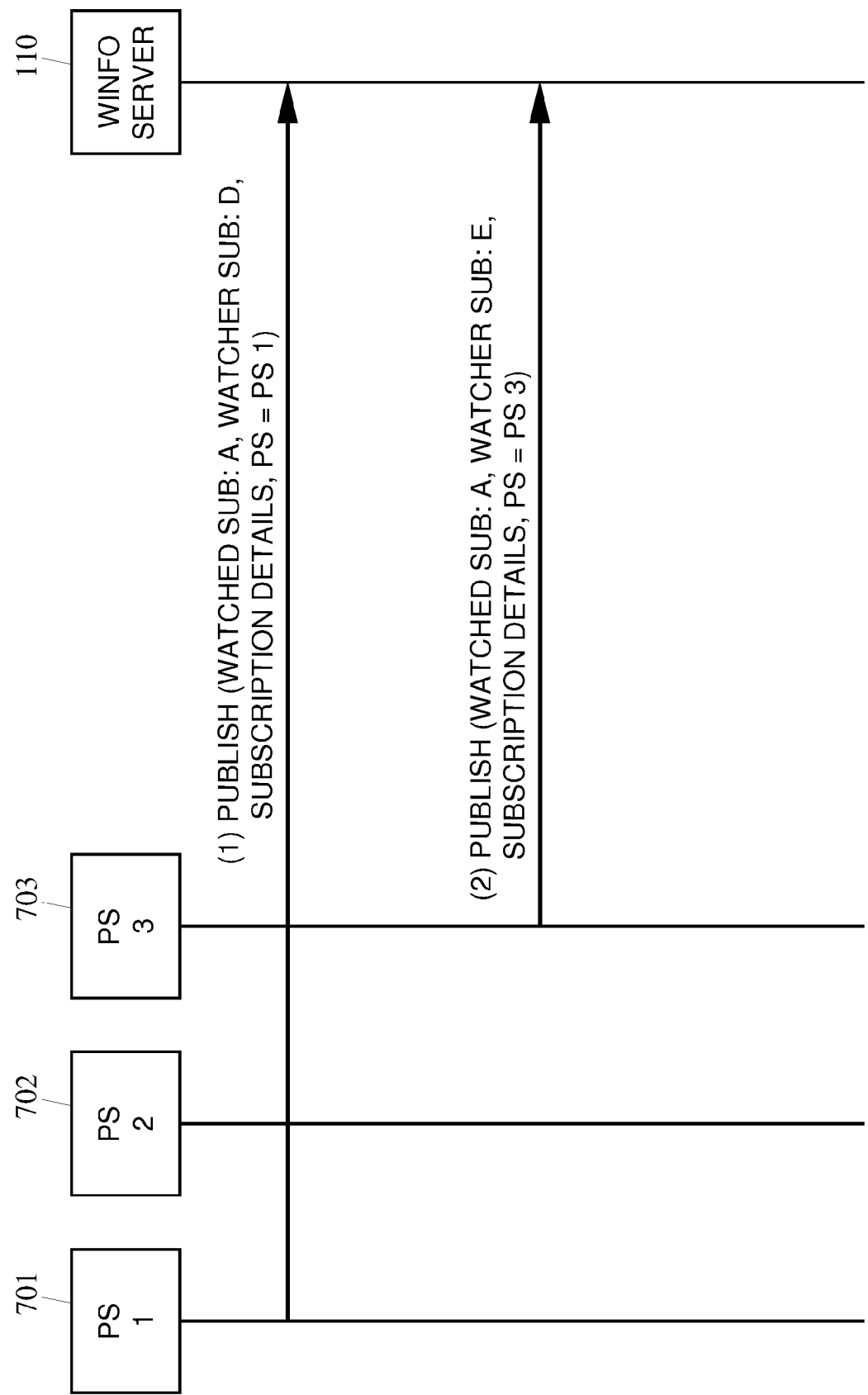
FIG. 8 is a signaling flow diagram illustrating a watcher information server receiving presence subscription information according to an embodiment of the subject matter described herein.

FIG. 8 depicts presence server 701 communicating presence subscription information to WINFO server 110, which may be authoritative for watched entity A. Although FIG. 8 depicts presence server 701 sending a SIP PUBLISH message to communicate the presence subscription information, it should be understood that any other similar mechanism or message may be utilized without departing from the scope of the present subject matter. Specifically, FIG. 8 illustrates that the presence subscription information received by WINFO server 110 includes a watcher entity identifier (for watcher entity D), a watched entity identifier (for watched subscriber A), and subscription details. Similarly, FIG. 8 also depicts presence server 703 communicating a SIP PUBLISH message that includes second set of presence subscription information to WINFO server 110. Specifically, the presence subscription information from presence server 703 is shown to include a watcher entity identifier (for watcher entity E), watched entity identifier (for watched entity A), and subscription details. Notably, FIG. 8 depicts that WINFO server 110 may receive presence service subscription information related to watched subscriber entity A from more than one notifier server source (e.g., a presence server).

Figure 9:
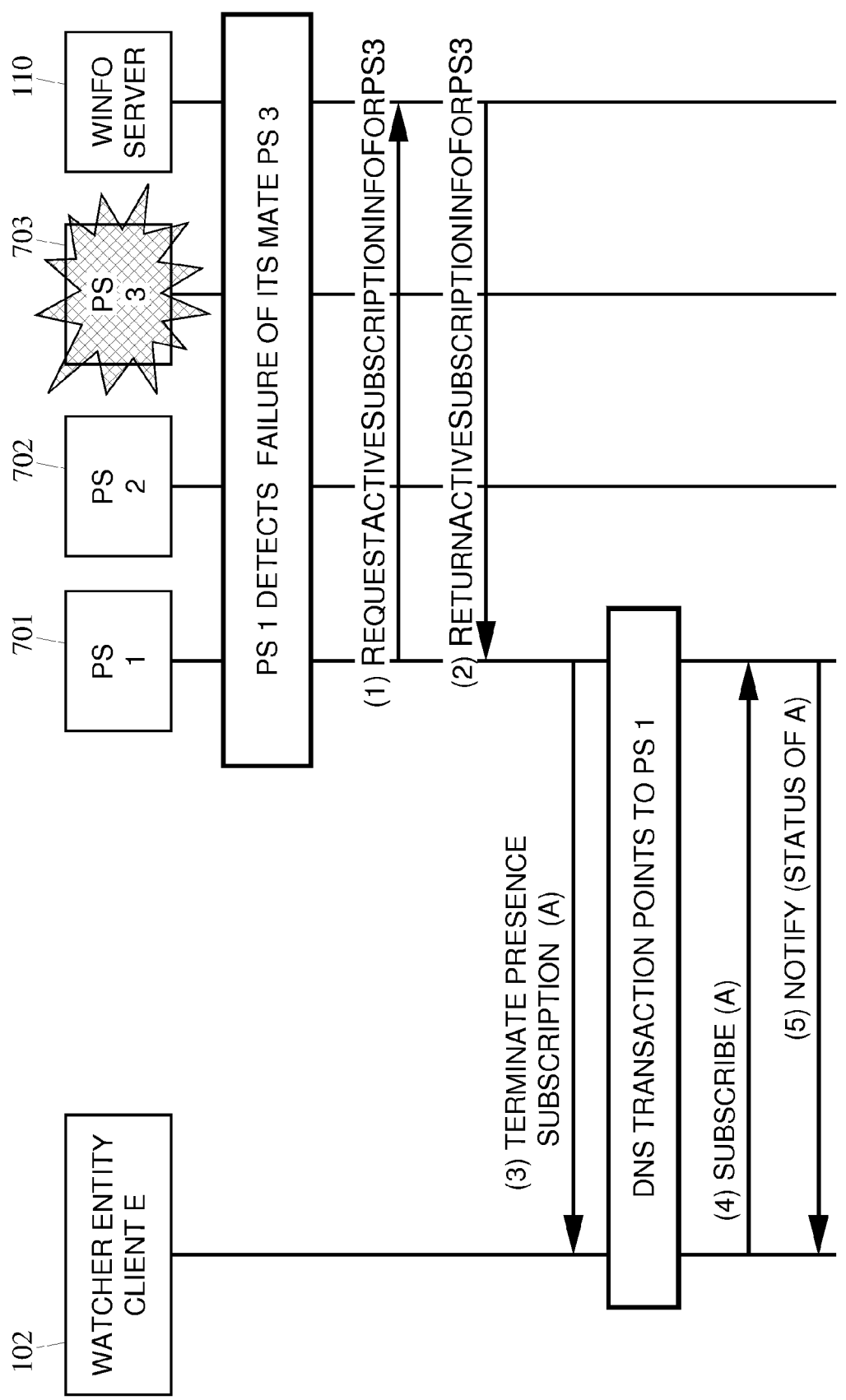
FIG. 9 is a signaling flow diagram illustrating a presence server detecting the failure of an associated presence server according to an embodiment of the subject matter described herein according to an embodiment of the subject matter described herein.

FIG. 9 depicts presence server 701 obtains SIP event subscription information from WINFO server 110 for the subscriptions that were previously serviced by failed presence server 703. In one embodiment, presence server 701 initiates contact with WINFO server 110 and requests the presence state subscription information associated with failed presence server 703. WINFO server 110 may respond to the request from presence server 701 with the necessary presence state information. In this embodiment, the presence state subscription information was managed by presence server 703. For example, WINFO server 110 may access database 118 (as shown in FIG. 1) to locate stored watcher entity subscription information that was handled by presence server 703. WINFO server 110 may then query database 118 in order to obtain an identifier for each of the watcher entities that were serviced by unavailable presence server 703.

In an alternate embodiment, the detection of failed presence server 703 (block 210) and the sending of instruction messages to watcher entity client 102 (block 214) may be performed by WINFO server 110 itself instead of the failover presence server 701. For example, FIG. 6 depicts presence server 703 failing and thereby becoming unavailable to communicate with any other network element. WINFO server 110 subsequently detects the unavailability of presence server 703. WINFO server 110 may be configured to detect presence server 703 as being unavailable by any manner, such as a failed ping messages or via a proprietary bus connecting the presence server with the WINFO server. WINFO 110 then determines and contacts the watcher entity clients that were formerly serviced by presence server 703, such as watcher entity client 102, by accessing database 118. For example, WINFO 110 subsequently sends a message (e.g., a SIP-based terminate presence subscription message) that instructs watcher entity client 102 to terminate its current presence subscriptions formerly serviced by presence server 703 (e.g., watched subscriber A) and to send a new subscription message in order to re-subscribe for presence information associated with watched subscriber entity A. When watcher entity client 102 contacts a DNS server in order to obtain the serving presence server address information, the DNS server points the watcher entity client 102 to a new failover presence server, e.g., presence server 701. Please note that although FIG. 9 shows that presence server 701 detected the unavailability of presence server 703 as well as being designated as the new serving (i.e., failover) presence server, this is not required and is only one exemplary illustration of the present subject matter. For example, presence server 702 could have been designated as the presence server responsible for detecting the unavailability of presence server 703 with presence server 701 still being the designated failover notifier server (and vice versa).

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing a failover measure in a communications network that includes a plurality of notifier servers, the method comprising:
   receiving, at a first notifier server from a watcher entity client, a first subscription request for SIP event information associated with one or more watched entity clients;
   receiving, at a watcher information (WINFO) entity, session initiation protocol (SIP) event subscription information that includes an identifier indicating that the first notifier server serves the watcher entity client;
   storing the SIP event subscription information in the WINFO entity;
   detecting the unavailability of the first notifier server; and
   sending an instruction message to the watcher entity client, based on the identifier in the stored SIP event subscription information, to direct the watcher entity client to terminate a subscription for the SIP event information serviced by the first notifier server and to generate a second subscription request for the SIP event information, wherein the second subscription request for the SIP event information is sent to a failover server.

2. The method of claim 1 wherein the SIP event information includes presence state information.

3. The method of claim 1 wherein the subscription request is a session initiation protocol (SIP) SUBSCRIBE message.

4. The method of claim 1 wherein in response to detecting the unavailability of the first notifier server, sending the SIP event subscription information associated with the first subscription request to the failover notifier server.

5. The method of claim 1 wherein the SIP event subscription information further includes an association between the watcher entity client to each of the one or more watched entity clients from the first notifier server.

6. The method of claim 1 wherein sending an instruction message to the watcher entity includes sending the instruction message from the WINFO entity.

7. The method of claim 1 wherein sending an instruction message to the watcher entity includes sending the instruction message from the failover notifier server.

8. The method of claim 1 wherein the watcher entity subscription information includes a watcher entity identifier and at least one of: a SIP event subscription expiration time associated with the watcher entity or a pending SIP event subscription request from the watcher entity.

9. The method of claim 1 wherein the first notifier server includes a resource list server.

10. The method of claim 1 wherein the first notifier server includes a presence service server.

11. The method of claim 1 wherein the SIP event subscription information includes at least one of presence service subscription information, dialog subscription information, voice mail subscription information, automatic callback subscription information, PSTN and Internet Internetworking (PINT) subscription information, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, or XCAP document change information.

12. The method of claim 1 wherein the SIP event subscription information includes presence service subscription information comprising a watcher entity identifier, a watched entity identifier, and subscription details.

13. A system for collecting and distributing session initiation protocol (SIP) event watcher entity subscription information in a communications network, the system comprising:
    a first notifier server for receiving, from a watcher entity client, a first subscription request for SIP event information associated with one or more watched entity clients, wherein the first notifier server includes a hardware processor configured to execute computer executable instructions stored on a non-transitory computer readable medium; and
    a watcher information (WINFO) server for receiving, from the first notifier server, SIP event subscription information that includes an identifier indicating that the first notifier server serves the watcher entity client, for storing the SIP event subscription information in the WINFO entity, wherein the WINFO server includes a hardware processor configured to execute computer executable instructions stored on a non-transitory computer readable medium; and
    a detection module for detecting the unavailability of the first notifier server and for sending an instruction message to the watcher entity client, based on the identifier in the stored SIP event subscription information, to direct the watcher entity client to terminate a subscription for the SIP event information serviced by the first notifier server and to generate a second subscription request for the SIP event information, wherein the second subscription request for the SIP event information is sent to a failover server.

14. The system of claim 13 wherein the detection module resides in the WINFO server or a second notifier server in the communications network.

15. The system of claim 13 wherein the SIP event information includes presence state information.

16. The system of claim 13 wherein the first subscription request is a first session initiation protocol (SIP) SUBSCRIBE message.

17. The system of claim 13 wherein in response to detecting the unavailability of the first notifier server, sending the SIP event subscription information associated with the first subscription request to the failover notifier server.

18. The system of claim 13 wherein the SIP event subscription information further includes an association between the watcher entity client to each of the one or more watched entity clients from the first notifier server.

19. The system of claim 13 wherein the watcher entity subscription information includes a watcher entity identifier and at least one of: a SIP event subscription expiration time associated with the watcher entity or a pending SIP event subscription request from the watcher entity.

20. The system of claim 13 wherein the first notifier server includes a resource list server.

21. The system of claim 13 wherein the first notifier server includes a presence service server.

22. The system of claim 13 wherein the SIP event subscription information at least one of presence service subscription information, dialog subscription information, voice mail subscription information, automatic callback subscription information, PSTN and Internet Internetworking (PINT) subscription information, conference state information, cryptographic certificates, pending consent information, http resource information, keypad markup language information, push-to-talk settings, registration state information, REFER operation progress information, policy documents, intelligent networking (IN) detection point information, user agent profile information, media statistics information, or XCAP document change.

23. The system of claim 13 wherein the SIP event subscription information includes presence service subscription information comprising a watcher entity identifier, a watched entity identifier, and subscription details.

24. A non-transitory computer readable medium having stored thereon executable instructions that when executed by the processor of a computer control the computer to perform steps comprising:

receiving, at a first notifier server from a watcher entity client, a first subscription request for session initiation protocol (SIP) event information associated with one or more watched entity clients, wherein the first notifier server is associated with a plurality of notifier servers;

receiving, at a watcher information (WINFO) entity, SIP event subscription information that includes an identifier indicating that the first notifier server serves the watcher entity client;

storing the SIP event subscription information in the WINFO entity;

detecting the unavailability of the first notifier server; and sending an instruction message to the watcher entity client, based on the identifier in the stored SIP event subscription information, to direct the watcher entity client to terminate a subscription for the SIP event information serviced by the first notifier server and to generate a second subscription request for the SIP event information, wherein the second subscription request for the SIP event information is sent to a failover server.

* * * * *